Jan. 5, 1960
H. P. LUHN
2,919,969
SEGMENTIZED TRACE-GENERATING UNIT
Filed Jan. 3, 1955
5 Sheets-Sheet 2
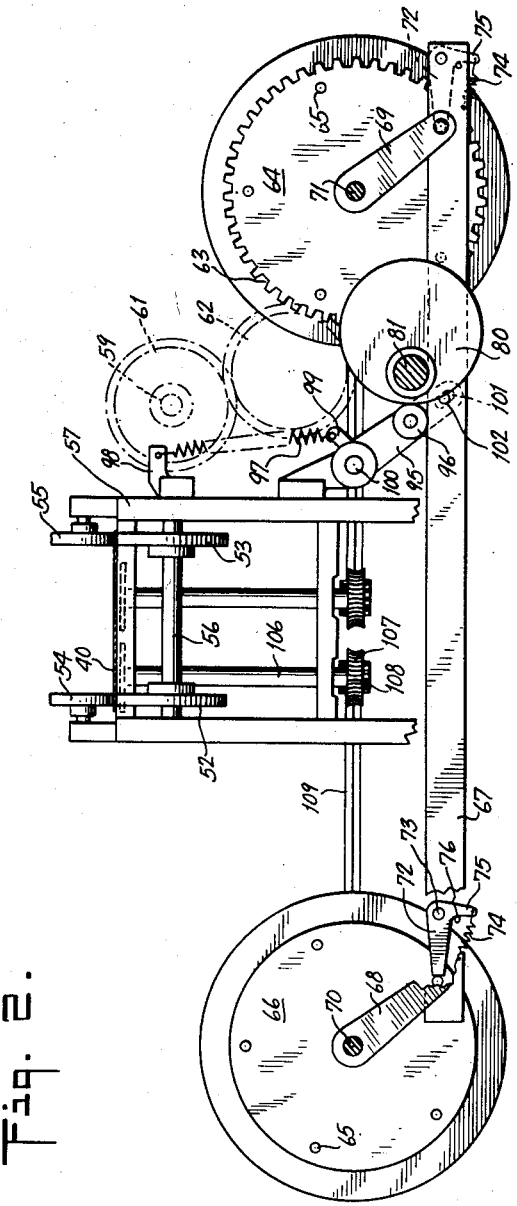
INVENTOR.
HANS P. LUHN
BY
ATTORNEY

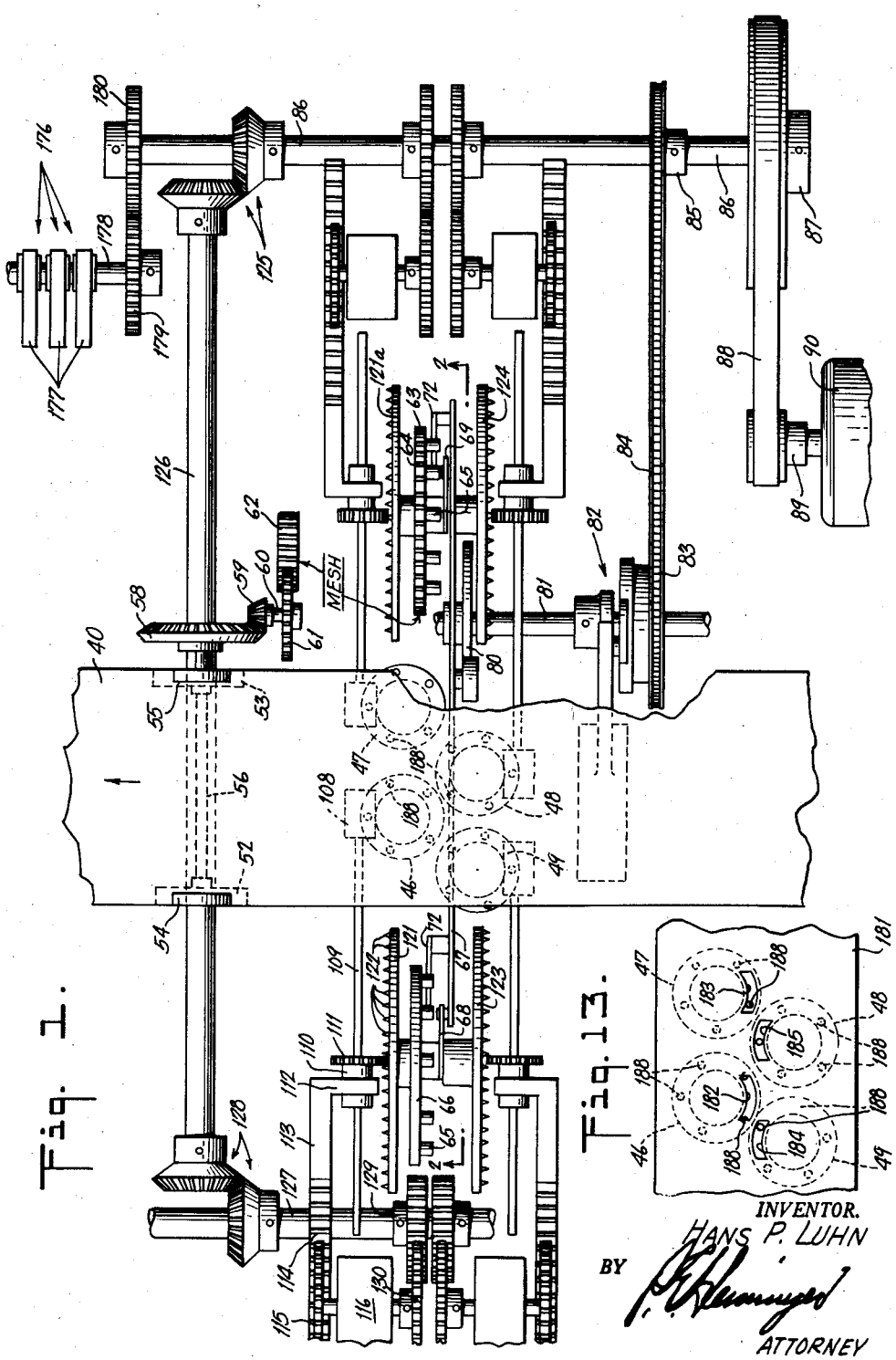

INVENTOR.
HANS P. LUHN
BY
ATTORNEY

Jan. 5, 1960

H. P. LUHN 2,919,969

SEGMENTIZED TRACE-GENERATING UNIT

Filed Jan. 3, 1955

INVENTOR.
HANS P. LUHN
BY
ATTORNEY

Jan. 5, 1960   H. P. LUHN   2,919,969
SEGMENTIZED TRACE-GENERATING UNIT
Filed Jan. 3, 1955   5 Sheets-Sheet 5
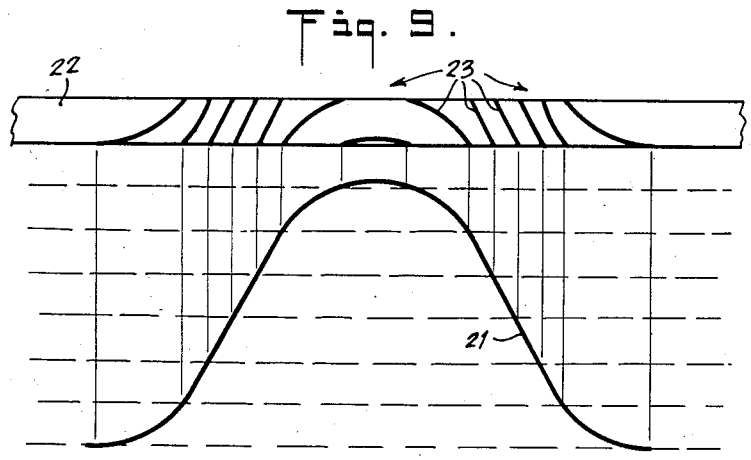
Fig. 9.
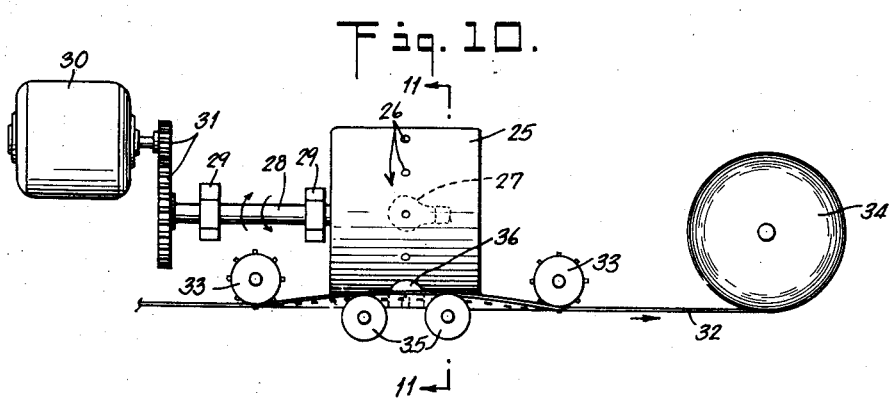
Fig. 10.
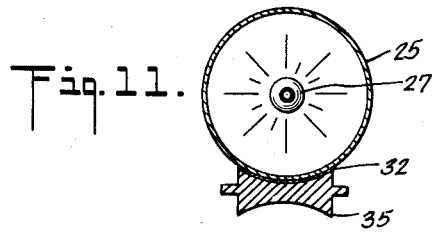
Fig. 11.
Fig. 12.
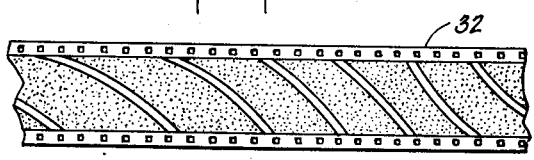
INVENTOR.
HANS P. LUHN
BY
ATTORNEY

United States Patent Office 2,919,969
Patented Jan. 5, 1960

2,919,969
SEGMENTIZED TRACE-GENERATING UNIT

Hans P. Luhn, Armonk, N.Y., assignor to International Business Machines Corporation, New York, N.Y., a corporation of New York Application January 3, 1955, Serial No. 479,490

3 Claims. (Cl. 346—113)

This invention is concerned with an analogue trace-generating method and apparatus for carrying out such a method. More specifically, the method and apparatus are concerned with generating a trace that is telescoped onto a narrow strip in such a way that it may be greatly enlarged, while still being contained on a convenient sized medium. The convenience of the size is due to the fact that by telescoping the trace onto a relatively narrow strip of thin material, the strip may then be rolled up at each end and so a relatively long strip of material may be conveniently contained on reels.

In machine tool controls, such an analogue trace is especially valuable, because where a program control is employed high performance may be obtained by using a greatly enlarged analogue trace for maintaining close tolerance control over the operation of the machine tool. In other words, when the function of the machine tool is controlled by an enlarged controlling pattern, the magnitude of movement of the controlled part may be greatly reduced as compared to the controlling pattern, and thus the performance and accuracy of the machine tool may be greatly improved.

Consequently, it is an object of this invention to teach a method of generating a telescoped, segmentized, analogue trace, representing a given space-time curve.

Another object of this invention is to provide certain apparatus which may carry out a method of generating a segmentized trace on a narrow strip of material.

Another object of the invention is to provide an apparatus which may generate a plurality of adjacent traces, each trace being segmentized, and all contained on a single, relatively narrow strip of material. This arrangement is particularly beneficial where several space-time curves are directly related to one another as in machine tool control, where the related controls for more than one axis of the tool are to be employed.

Briefly, this invention includes apparatus for generating a segmentized analogue trace on a narrow strip of material from digital information, which is in the form of slopes of said trace. Such apparatus includes means for feeding said strip longitudinally at a given speed and moving a trace-generating element transversely across the effective width of said strip. The trace-generating element is moved in directions and at speeds varying according to the slope of said trace. In addition, the invention includes a segmentized trace-generating unit for producing a space-time analogue curve that is telescoped into segments across the width of a relatively narrow strip. The unit also includes means for advancing said strip longitudinally at a predetermined rate, and means for moving a series of trace-generating elements transversely across said strip at speeds varying according to the slope of the curve being generated. The trace-generating elements are spaced apart by a distance equal to the width of said strip.

These and other objects and principles of the invention are set forth more fully below and are illustrated in the drawings, in which like reference numbers refer to like parts throughout, and wherein:

Fig. 1 is a plan view partially broken away, of a plural, segmentized trace-generating apparatus according to this invention;

Fig. 2 is a vertical view taken along the line 2—2 in Fig. 1 looking in the direction of the arrows, and showing the tape feed drive as well as a ratchet drive for the variable speed-driving discs;

Fig. 3 is an enlarged, partial face view of one of the variable-speed driving discs;

Fig. 4 is an enlarged detail, cross-sectional view taken along the line 4—4 of Fig. 3;

Fig. 9 is an illustrative space-time curve showing the manner in which a given curve may be telescoped onto a narrow strip;

Fig. 10 is a side schematic illustrating other apparatus which may be employed to generate a segmentized trace;

Fig. 11 is a cross-sectional view taken along the line 11—11 of Fig. 10;

Fig. 12 is a short length of film strip containing segmentized traces, such as might be generated by the apparatus of Figs. 10 and 11; and Fig. 13 is a fragmentary showing of a shield for the machine of Fig. 1.

Figure 5:
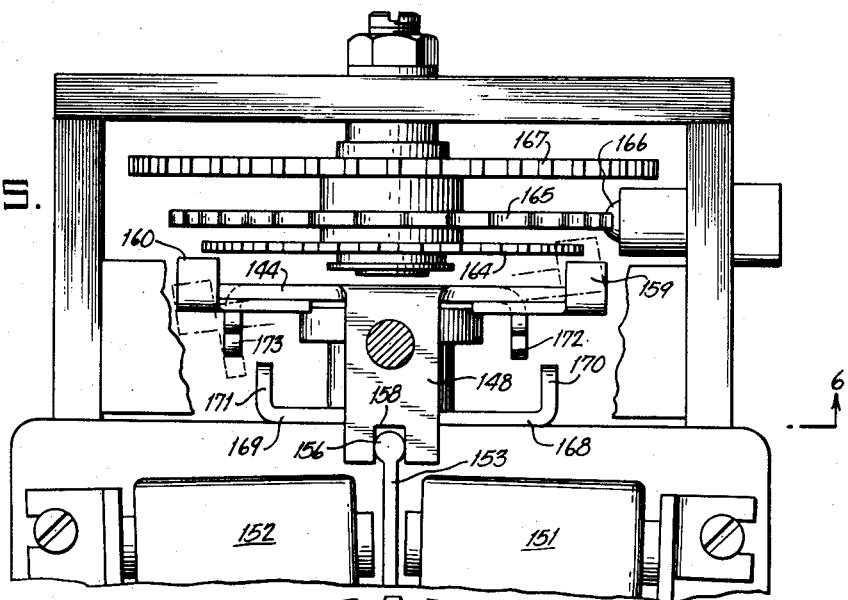
Fig. 5 is a partial plan view of one of the positioning mechanisms employed in the unit.

Referring to Fig. 9 first, it will be observed that there is shown a curve 21 which has been segmentized and projected onto a relatively narrow strip 22. It will be noted that segments 23, as contained on the strip 22, are projections from the curve 21. It is pointed out that a fundamental aspect of this invention is that of telescoping a curve in this manner onto a narrow strip.

The resulting segmentized curve has one of its dimensions telescoped or compressed onto a relatively narrow strip such as strip 22. In this manner, although the full spread of the curve in the horizontal or abscissal direction (when viewed as shown in Fig. 9) is undiminished, this undiminished dimension of the curve may be handled readily in spite of its great length, once it has been segmentized and recorded on the narrow strip, which is then rolled up at one or both ends. Consequently, it will be clear that a great saving in the space necessary for representing a given analogue curve may be effected by employing this technique of segmentizing the curve and recording the segments in succession on a narrow strip. A particularly beneficial use for a curve as thus segmentized and recorded on a narrow strip is that of machine tool control, such as mentioned above, and an example of such use may be found in United States Patent 2,806,986, issued September 17, 1957, for High Performance Servo-System, in the name of Hans P. Luhn (IBM Docket 4663).

One example of apparatus for carrying out the method of segmentizing an analogue trace that is telescoped onto a narrow strip, in a manner as just described in connection with Fig. 9, is that illustrated in Figs. 10 and 11. It will be observed that there is a drum 25 that is opaque and hollow, and that has a series of holes 26 centrally located from either end, and all in a plane perpendicular to the rotation axis of the drum. Centrally located within the drum 25 along the axis thereof there is a light source such as a bulb 27. The drum 25 is rotatable in either direction by means of a shaft 28 that is secured in place by bearings 29. The drum 25 may be rotated in any convenient manner, such as by a motor 30 that is geared to the shaft 28 by gears 31. Thus, the analogue trace generated will be representative of the function as performed by an input such as the motor 30. Located longitudinally, generally parallel to the axis of the drum 25, there is a strip of material 32, which in this instance may be photographic film. The strip of film 32 is fed longitudinally in close proximity with the outer surface of the drum 25 by means of sprocket wheels 33, and is taken up on a reel 34 thereafter. In order to have the film strip 32 conform to the curvature of the outer surface of drum 25, there is a pair of curved surface rollers 35. To confine the action of light as transmitted through the holes 26 to a working area, or width of the film strip 32, there is a shield 36.

Now it will be appreciated that a segmentized trace, such as that described above, may be generated on the strip 32. Of course, the strip 22 of Fig. 9 might be any appropriate material depending upon the type of trace to be employed. The trace might be magnetic, electrical, mechanical, or photographic, for example. The changes in equipment necessary to employ any given type of recording medium for the trace will readily suggest themselves to anyone skilled in the art.

The speed or rate of advance of the film strip 32 will be predetermined and ordinarily maintained at a fixed rate as determined by the driving sprockets 33. Then the drum 25 may be rotated at various speeds as desired in order to produce the trace with varying slopes, depending upon the speed of rotation of the drum 25. It is to be noted that the spacing of holes 26 is such that as the drum 25 rotates, one hole 26 will appear at one edge of the film strip 32 as the preceding hole leaves the other edge of the strip. Consequently, the segments of the trace as generated on the film strip 32 will have continuity, and may be employed as a controlling element in a system for reproducing the space-time characteristics of the curve. As indicated above, it will be obvious to anyone skilled in the art that, although a film strip has been illustrated as the medium for recording the segmentized trace, many other types of materials and apparatus might be employed to record a segmentized trace in accordance with these teachings. For example, the strip 32 might be composed of magnetic material that may be permanently magnetized in any given localized areas. The trace would then be recorded by appropriate magnetic means carried on apparatus similar to the drum 25. Likewise, a strip of non-conducting material might be employed while the segments of the trace would then be composed of a metallic or conducting material. Consequently, the record as thus produced might be followed by means of a spark-sensing device, or the like. Many other variations will suggest themselves to anyone that is familiar with this field of space-time curve records and record-control devices.

Before describing the details of the apparatus as illustrated in Figs. 1–7, it may be pointed out that this apparatus employs a plurality of trace-generating heads, each of which will be confined to its own fraction of the total width of a record strip. The trace segments as thus recorded by each generating head will be adjacent to one another on a single strip of material. In this manner the related analogue curves for controlling certain functions, such as the various axis controls of a machine tool, may be all recorded on a single strip of material. In this manner their relationship may be closely maintained at all times. Such confining means is not illustrated in Figs. 1–7 for the sake of clarity, but it will be understood that the necessary light shields will be employed to confine the effective operation of each of the several trace-generating heads to its own tape track.

Figure 8:
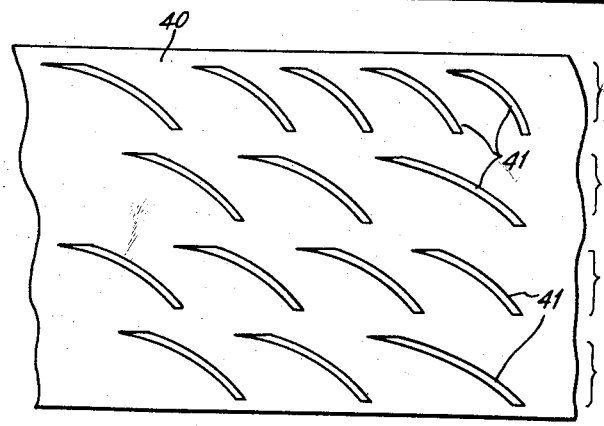
Fig. 8 is a short length of a strip containing segmentized traces as generated by the unit illustrated in Figs. 1—7.

Fig. 1 illustrates an entire machine for generating four sets of segmentized traces on a strip of material 40, which is photographic film in the illustrated embodiment. The nature of the segmentized traces, as recorded on the film strip 40, has been explained above in connection with Fig. 9, and an illustration of a short portion of the strip 40, is shown in Fig. 8. There is a group of trace segments 41 as they will look following their generation by operation of the machine illustrated in Fig. 1. It will be noted that there are four separate strips 42, 43, 44 and 45, each of which has the segments 41 that go to make up a separate trace that represents an analogue or space-time curve having a given function. To generate each of the four strips 42–45, there are four trace-generating heads 46–49 (Fig. 1). These are located as shown underneath the strip 40, and if a photographic record is to be generated, appropriate light source and shielding elements (not shown) will be included.

The film strip 40 is fed longitudinally, as indicated by the arrow, at a given rate in an intermittent fashion. The reason for the intermittent feed is to permit digitally introduced changes in speed of rotation of the trace-generating heads 46—49, as will appear more fully as the description proceeds. There is a pair of feed wheels 52 and 53 that are located underneath the strip 40, as more clearly shown in Fig. 2. To maintain frictional contact with the strip 40, there are two freely rotatable pressure wheels 54 and 55. These are located directly above the feed drive wheels 52 and 53, respectively, and may have a spring-bias arrangement (not shown) or other means for maintaining sufficient pressure between the tangentially situated edges of corresponding drive and pressure wheels, e.g. wheels 52, 54 and 53, 55, respectively. Drive wheels 52 and 53 are securely fastened for rotation with a shaft 56 that has also a beveled gear 58 fixed to the end of the shaft 56 which extends beyond one side of a frame 57. Meshing the beveled gear 58 is a beveled pinion 59 that is carried on a short shaft 60. The shaft 60 also carries a gear 61 which in turn meshes with a gear 62 of equal diameter and number of gear teeth. Gear 62 in turn meshes with gear teeth 63 located around the periphery of a disc 64.

The disc 64 is rotated intermittently by means of a set of five pins 65 that are located near the periphery of the disc 64, and extend from one face of the disc with their axes parallel to the rotational axis of the disc. The disc 64 and a similar disc 66 on the other side of the machine are rotated intermittently in a clockwise direction (as viewed in Fig. 2), by one-fifth of a revolution at a time. To accomplish this intermittent rotation of the discs 64 and 66, there is an oscillatory bar 67 that is supported by a pair of arms 68 and 69. Arms 68 and 69 are freely rotatable, i.e. they may swing freely about their pivots which consist of shafts 70 and 71. Near each end of the bar 67 there is a pawl 72 which is pivoted about a shaft 73 on the bar 67, and which is spring-biased into the generally horizontal position illustrated by means of a spring 74 which acts to bias the pawl 72 for clockwise rotation when viewed as shown in Fig. 2. This is accomplished by means of a short crank arm 75 that is integral with the pawl 72. There is a stop pin 76 located on the bar 67, which contacts the crank arm 75 of the pawl 72 to maintain the resting position of the pawl generally horizontal as shown in Fig. 2. It is pointed out that each of the pawls 72 is identical, one being located at each end of the bar 67. In each case a pawl 72 cooperates with the pins 65 located on the respective discs 64 and 66.

The bar 67 is oscillated horizontally back and forth by means of an eccentric 80 that is securely fastened to a shaft 81 which is driven by the output of a one-rotation clutch 82. The input to the one-rotation clutch 82 is driven via a sprocket 83 which carries a chain 84 in engagement therewith and which chain also engages a sprocket 85 that is secured to a power driven shaft 86. Power shaft 86 is driven by means of a pulley 87 that is securely attached thereto and which has a belt 88 in engagement therewith that is driven from another pulley 89 secured to the end of the drive shaft of a motor 90.

The eccentric 80 has in engagement with its periphery a follower wheel 96 that is carried in a freely rotatable manner on a pivotal arm 95 near the extremity thereof. Wheel 96 is engaged with the peripheral surface of eccentric 80 by means of a spring 97 which is attached to the frame 57 by means of a bracket 98, and attached to the arm 95 by means of a short extension or crank arm 99. Thus, since the arm 95 is pivoted about a shaft 100, the spring 97 tends to cause the arm 95 to rotate counter-clockwise, as viewed in Fig. 2, and so bring follower wheel 96 into engagement with the surface of eccentric 80. The arm 95 extends beyond follower wheel 96 and is connected to the bar 67 by means of a slot 101 at the extremity of the arm 95. The slot 101 is engaged by a pin 102 located on the bar 67. Now, when the driven shaft 81 rotates the eccentric 80, it causes the arm 95 to pivot about its shaft 100 and carry the bar 67 in an oscillatory manner therewith. The bar 67 is supported by the arms 68 and 69 and oscillates left and right, as viewed in Fig. 2, with a certain amount of vertical motion included. Thus, as the bar 67 is oscillated to the left, from the position illustrated, it rotates the discs 64 and 66 through one-fifth of a revolution, or until the extreme left-hand position is reached by the oscillation of the bar 67. Then on the return movement or oscillation of the bar 67, the pawls 72 no longer engage the pins 65 and discs 64 and 66 remain stationary. Finally, the pawls 72 are rocked against their spring bias as the bar 67 reaches its right-hand position and the pawls contact the next pin 65. The pawls 72 may then fall into place behind the next pin 65, ready for a new step of rotation of the discs 64 and 66.

At the same time as the strip 40 is being fed longitudinally through the machine, the trace recording heads 46—49 are rotated at a predetermined rate in any one of a given number of steps or rates of rotation. In the machine illustrated, each head may be rotated at one of twelve rates including zero, by means of the variable speed drive units now to be described. It will be observed that there are four identical variable speed drive units, one for each of the record heads 46–49, and consequently only one of these variable speed drives need be explained in detail.

To explain the reversible, variable speed drive for the recording heads take, for example, the recording head 46. Referring to Figs. 1–4, it is pointed out that the recording head 46 is carried at the upper extremity of a shaft 106 for rotation therewith. Shaft 106 has a worm wheel 107 near the other extremity thereof which is in engagement with a worm 108. The worm 108 is securely fastened to one end of a square shaft 109 for rotation therewith. It will be clear that this shaft 109 might have other cross-sectional configurations than a square. The arrangement is such that a hub member 110, which carries securely attached thereto a gear 111, may slide along the length of the shaft 109 while maintaining positive rotational engagement with the hub member 110, in order to rotate the shaft 109 whenever the gear 111 is rotated. Hub member 110 is supported in a freely rotatable manner in a bracket 112, at one end of an arm 113, which has a rack 114 along an upper surface thereof, as viewed in Fig. 1. Engaging the rack 114 is a gear 115 that is rotated from the output of a step-by-step positioning mechanism 116. The details of such a step-by-step positioning mechanism will be more fully set forth below.

Located adjacent to the gear 111 for driving engagement therewith, there is a disc 121 which has on the face thereof, next to the gear 111, a series of concentric rings of pins 122. These pins 122 are generally frusto-conical in shape, and are adapted to engage in driving relation with the teeth of gear 111. All of the pins 122 in each concentric ring thereof are the same size and are located the same distance apart circumferentially, so that when the gear 111 is in engagement with any one of the rings of pins 122 (see Fig. 4), rotation of the disc 121 will rotate the gear 111 at predetermined rates of rotation depending upon which ring of the pins 122 is engaging the gear 111.

Now it is pointed out that the positioning mechanism 116 is so constructed that each step of output motion which it produces causes a sliding of gear 111 as carried by the hub 110, along the square shaft 109 an amount equal to the radial spacing between consecutive concentric rings of the drive pins 122. Consequently, as the disc 121 is rotated by the rotation of the drive disc 66 (to which it is integrally attached), the gear 111 will be rotated at a predetermined speed. Such speed will be one of twelve speeds including zero, since the gear 111 may be positioned at the exact center of the drive disc 121 where no rotation will be imparted to the gear 111. Rotation of the gear 111 will rotate the square shaft 109 and the worm 108 at the extremity thereof. This, in turn, will cause rotation of the shaft 106 (that carries the worm wheel 107) and consequently will rotate the recording head 46. It will be noted that rotation of the recording head 46 may be in either direction, depending upon which side of the center of disc 121 the gear 111 is located.

It is pointed out that whereas the intermittent drive is imparted directly to the drive discs 64 and 66, and variable speed discs 121a and 121, respectively, are integral with the drive discs, the other two variable speed discs, viz. discs 123 and 124, are securely fastened to the same shaft as the discs 121 and 121a, respectively, for rotation therewith. Consequently, all four variable speed discs 121, 121a, 123 and 124 are rotated at the same speed through one-fifth of a revolution each time the one-revolution clutch 82 is actuated. It will be appreciated that one-revolution clutches are old and well known, and any feasible type may be employed at 82. The details of this clutch per se form no part of the present invention.

Input power for rotating the position mechanisms, e.g. mechanism 116, is a continuous drive that is derived from the input power for the machine. This power is transmitted via the drive shaft 86 and beveled gears 125 to a shaft 126, which in turn drives another shaft 127 via similar beveled gears 128. Each of the positioning mechanisms has its input driven in an identical manner so that only the drive for positioning mechanism 116 will be described. Shaft 127 has securely attached thereto for rotation therewith a gear 129 which meshes with an input gear 130 of the positioning mechanism 116. The input drive as applied to the positioning mechanism 116 is, therefore, a continuous rotation which is transformed into step-by-step reversible output rotations having a given degree of rotation by means of the positioning mechanism, the details of which are described below. The input shaft for positioning mechanism 116 is that which carries the input gear 130 pinned thereto, or otherwise attached securely for rotation therewith. This input shaft corresponds to shaft 140 (Figs. 6 and 7) of the detailed showing of a positioning mechanism, e.g. mechanism 116 or one of the other three positioning mechanisms shown in Fig. 1.

Figure 6:
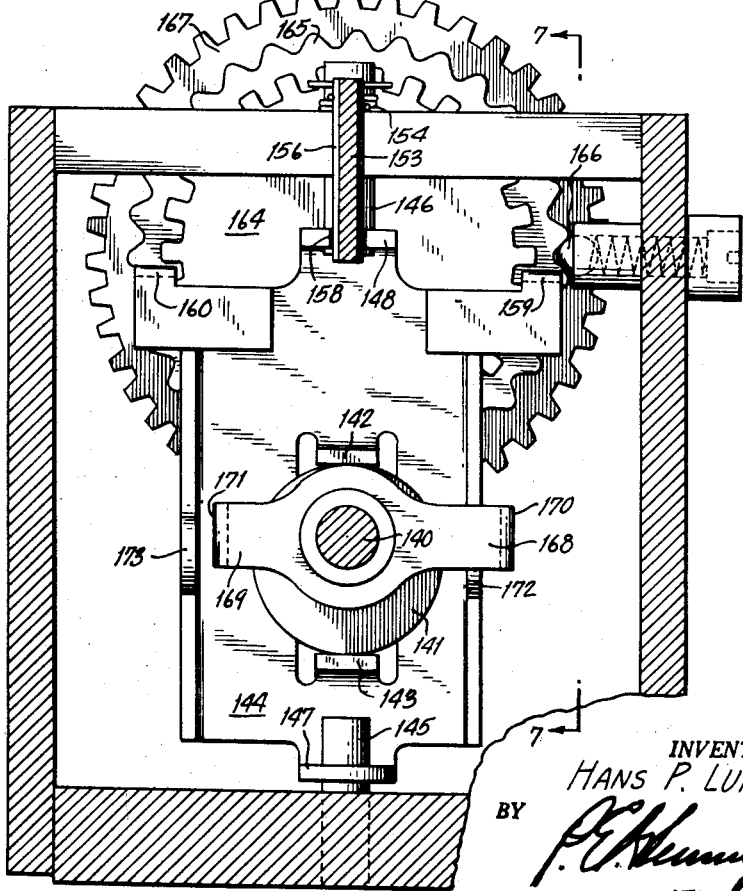
Fig. 6 is a cross-sectional view taken along the line 6—6 of Fig. 5 looking in the direction of the arrows.
Figure 7:
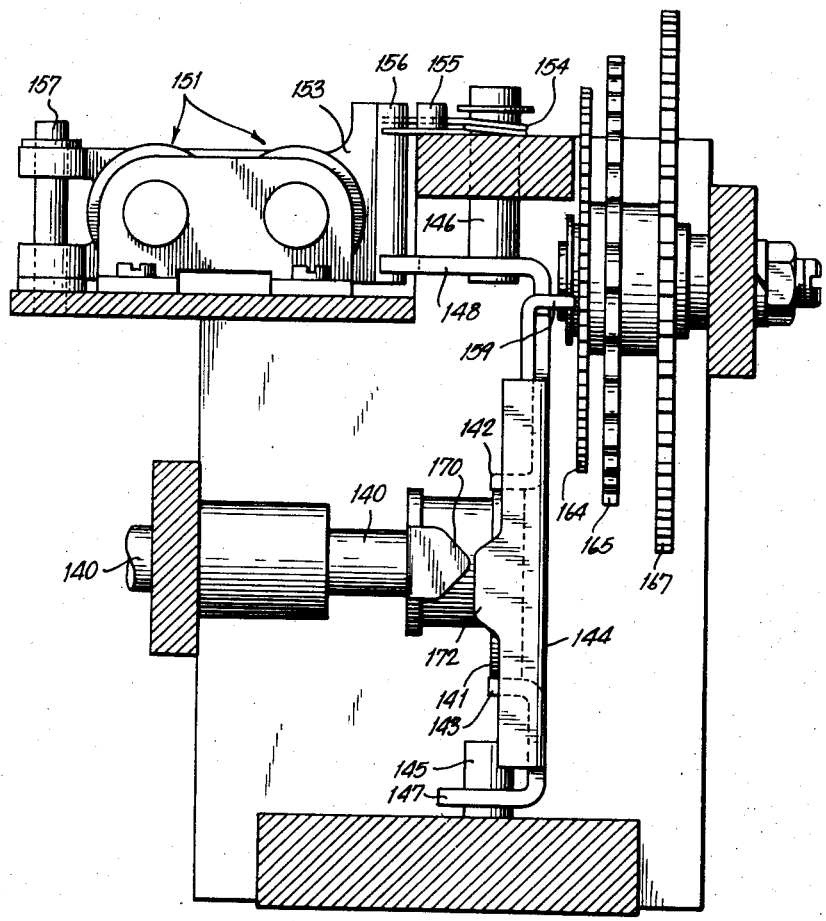
Fig. 7 is an end elevation, partly in cross-section, taken along the line 7—7 of Fig. 6.

The details of a positioning mechanism, such as the mechanism 116, are identical for all of the four positioning mechanisms of the machine, and there is one for each recording head 46–49, respectively. Referring to Figs. 5–7 for the details of one positioning mechanism, it will be observed that the constantly rotating input power is transmitted via a shaft 140 (Figs. 6 and 7) which has secured thereto, for rotation therewith, an eccentric disc 141. Disc 141 is engaged by a pair of ears 142 and 143 that are struck out of a rockable plate 144. The plate 144 has side channels for stiffness and is supported for translation longitudinally (up and down as viewed in Figs. 6 and 7), as well as in a rockable manner about a longitudinal axis, on a pair of extending shafts 145 and 146. The plate 144 has end members 147 and 148 which have holes therein to accommodate the extended shafts 145 and 146, respectively, for rotatable and slidable support thereby. Plate 144 will, therefore, be constantly oscillated up and down longitudinally in a sliding manner along the supporting shafts 145 and 146, as the input shaft 140 is rotated and turns the eccentric 141 which carries the plate 144 up and down in an oscillatory manner by reason of the engaging ears 142 and 143 at the periphery of the circular disc 141 of the eccentric.

The continuously oscillating movement of the plate 144 is transformed into steps of rotational output movement by an electrically controlled arrangement which includes a pair of solenoid operated electromagnets 151 and 152. These electromagnets act upon an armature member 153 situated midway between the pole pieces of the magnets. The armature 153 is spring-biased into this position by means of a double-acting coil spring 154 which is situated around an upper extension of the shaft 146 and which spring has the two ends thereof extending one on either side of a lug 155. These ends of the spring 154 also extend beyond the lug 155 to either side of a rounded edge portion 156 of the armature 153. In this manner the spring 154 will tend to return the armature 153 to its neutral or intermediate position (illustrated in Fig. 5) about the pivot for the armature 153. This pivot includes a shaft 157, as illustrated in Fig. 7. The rounded edge portion 156 of the armature 153 is situated within a notch 158 in the extremity of the member 148, so that upon energization of the core of one or the other of the magnets 151 or 152, the armature 153 will be pivoted one way or the other and thereby will cause a pivoting or rocking of the plate 144 about its supporting shafts. Such rocking of plate 144 is caused by the interaction between the notch 158 in the extension of member 148, in conjunction with the rounded edge 156 of the armature 153.

A rocking of the plate 144 will cause one of a pair of right angle driving ears 159 and 160 to pivot into engagement with the square teeth of an output drive wheel 164. Consequently, when the oscillatory longitudinal movement of the plate 144 takes place, one of the driving ears 159 or 160 will contact a tooth of the output drive wheel 164, in the manner illustrated in dotted lines in Fig. 5, and cause a predetermined amount of rotation of the driving wheel 164. This rotation will be in one direction or the other depending upon which of the ears 159 or 160 has been tipped into engagement with the teeth of the wheel 164. It will be noted that the output drive wheel 164 is securely attached to, for rotation with, a stepping wheel 165 having rounded teeth thereon which are engaged by a spring-biased ball 166, to aid in the exact final positioning of the output drive. Finally, output drive gear 167 is integrally attached to stepping wheel 165 as well as drive wheel 164. The output gear 167 corresponds to the gear 115 illustrated in Fig. 1.

In order to avoid the possibility of plate 144 sticking in its rocked position of engagement with the output wheel 164, a pair of knock-off or centering arms 168 and 169 are securely fastened to the input drive shaft 140 and are continuously rotated therewith. At the extremity of each knock-off arm 168 and 169 are two more or less rounded tips 170 and 171 (Fig. 5) respectively, that are bent at right angles to the arm in each case and thus extend toward the plate 144. In each case the radial position of the tip members 170 and 171 (relative to the shaft 140) is not equal to the other but coincides with the radial distance of the channel edges of the plate 144, which are also unequal in radial distance from the centerline of the input motion shaft 140. Now, there are located centrally of the plate 144, one on each channel edge thereof, raised cam action surfaces 172 and 173. During each complete revolution of the drive shaft 140, each of the pointed tip portions 170 and 171 of the arms 168 and 169, traverses a path directly in the same plane with one of the two knock-off or cam action surfaces 173 and 172, respectively. Consequently, should the plate 144 remain in its tipped position, the pointed tip 170 or 171 will come in contact with the corresponding cam action surface 172 or 173 and forcibly return the plate 144 to its neutral or disengaging position.

Returning to Fig. 1 it is pointed out that there is a set of cams 176 for timing the action of a group of switches 177 controlled thereby. The cams 176 are carried on a shaft 178 that is rotated by a gear 179 attached thereto. Gear 179 is rotated by a meshing gear 180 that is attached securely to the end of the shaft 86 for rotation therewith. In this manner the timing of the actuation of the positioning mechanisms may be synchronized with the machine so that the changes in position of the variable speed gears, e.g. gear 111, may be accomplished during the half of a cycle when the variable speed drive discs 121, 121a, 123 and 124 are stationary.

Fig. 13 illustrates a shield for use with the machine shown in Figs. 1 and 2, in generating a control tape like that shown in Fig. 8. There is an opaque body portion 181 which may have any appropriate shape and thickness depending upon how it is to be adapted for mounting on the machine. There are four arcuate slots or openings 182, 183, 184 and 185 which will be located directly over the peripheries of the generating heads 46–49 as shown in dotted lines. It is pointed out that the straight edges of each of the slots 182–185 will lie directly over and determine the edges of the four strips 42–45 (Fig. 8) of the tape 40 as generated thereon. The arcuate shape of the slots corresponds to the arcuate path of travel of a set of five holes 188 located near the periphery of each generating head 46–49, and the length of each slot or opening 182–185 is equal to the arcuate distance between corresponding parts of any two adjacent holes 188.

Thus, each segment 41 (Fig. 8) of a trace on any given strip on the film 40 is generated by one of the holes 188 sweeping across the slot and the next adjacent segment of the trace begins where the preceding one ended but at the opposite edge of the strip. It is pointed out that the slope of the segments depends upon the speed of rotation of the generating head forming them relative to the speed of advance of the film 40. Consequently, the number of segments generated during one feed cycle of the machine will vary widely.

*Operation*

The operation of the entire machine will be discussed in reference to Figs. 1 and 2. Considering a single strip, e.g. strip 43 (Fig. 8) on the film 40, the segments are generated by light passing through the holes 188 in the generating head 46. The slope of the trace or segment thereof as formed on the film strip 40 is determined by the relative speeds of the advance of the strip 40 and the rotation of the generating head 46, as discussed above. The segments 41 (Fig. 8) of the trace as formed are not necessarily generated one at a time, although the generation of segments is done in a step-by-step manner.

Each step or cycle in the generation of the segments is controlled by the one-revolution clutch 82 which has its input continuously driven from the chain 84 which engages the sprocket wheel 83. When the clutch is engaged, a complete revolution of the output shaft 81 will cause a single cycle of the segment trace generation to begin. Such a cycle may be traced beginning with the last half of the cycle first.

Rotation of the eccentric 80, that is attached to the shaft 81, causes the bar 67 to oscillate to the left as viewed in Figs. 1 and 2. During this oscillation the variable speed drive wheels 66 and 64 will be rotated through one-fifth of a revolution at a predetermined speed as controlled by the input driving connections from the motor 90. At the same time, the feed wheels 52 and 53 will cause the film strip 40 to be advanced at a fixed rate because the drive for these feed wheels 52 and 53 includes the gear train that meshes with gear teeth 63 on the variable speed drive wheel 64. This train of gears includes gears 62, 61, beveled pinion 59 and beveled gear 58 which is attached to the shaft that carries drive wheels 52 and 53.

During this portion of the cycle, while the film strip 40 is advanced at a predetermined fixed rate, the generating head 46 is rotated at one of twelve different speeds including zero, eleven in either direction, depending upon which row of the pins 122 is engaging the gear 111 of the variable speed drive mechanism. This rotation of the generating head 46 takes place at the same time as the advance of the film strip 40, since it is produced by the rotation of the variable speed drive disc 121. It will be noted that the location of the gear 111 to determine which row of pins 122 are in engagement therewith is controlled by the bracket 112 on the end of arm 113 that includes a rack 114. This positioning is controlled by the positioning mechanism 116 that rotates the gear 115 which meshes with the rack 114. The details of the positioning mechanism 116 have been fully described above and are illustrated in Figs. 5, 6 and 7.

The first half of each cycle occurs when the eccentric 80 makes its first one hundred and eighty degrees of rotation to oscillate the bar 67 over to an engaging position with the next pin 65 on the drive discs 64 and 66. During this time, while the driving mechanisms for advancing the film strip 40 and rotating the record heads 46—49 remain stationary, the coil for magnet 151 or 152 (Figs. 5 and 7) will be energized under control of one of the switches 177 and the positioning mechanism 116 will set the gear 111 to its next position.

Consequently, the operation of the machine in generating trace segments may be stopped after each single cycle, or interrupted at will, but ordinarily the operation of the input drive on shaft 81 will be continuous by reason of the clutch 82 having been actuated each revolution of the input drive via sprocket 83.

It will be observed that the generation of any given segmentized trace will include the steps of digitally positioning the gear 111 of the variable speed rotation mechanism that rotates the generating head 46, and then advancing the film or strip to receive the trace, at a fixed rate, while the head 46 is rotated at the set rate. Thus, the trace generating light spot is swept across the strip in a repeating manner to form the segments as desired. The slope of the segments, as stated, is determined by the relation of the fixed rate of advance of the strip and the speed of rotation or sweep of the trace generating spot transversely across the strip.

While certain embodiments of the invention have been described in detail in accordance with the applicable statutes, this is not to be taken as in any way limiting the invention, but merely as being descriptive thereof.

It is claimed:

1. A segmentized trace-generating unit for producing a variable space-time analogue curve telescoped into segments across the width of a relatively narrow strip comprising means including a drive motor for intermittently advancing said strip longitudinally at a predetermined rate, a trace-generating head having a plurality of circularly located trace-generating elements thereon, said elements being spaced apart equally as measured circumferentially around the circle, said element spacing being equal to the effective width of the strip, variable speed drive means for rotating said generating head about the axis of said circle of elements including a driving disc directly driven with said strip advancing means, means cooperating with said driving disc and being driven thereby for providing a plurality of speeds of rotation for said head, and a drive connection between said drive motor and said variable speed drive means.

2. A segmentized trace-generating unit for producing a space-time analogue curve telescoped into segments across the width of a relatively narrow strip comprising means for periodically advancing said strip longitudinally at a predetermined rate, a trace-generating head having a plurality of circularly located trace-generating elements thereon, said elements being spaced apart equally as measured circumferentially around the circle, said element spacing being equal to the effective width of the strip, variable speed driving means for rotating said generating head about the axis of said circle of elements including a driving disc directly driven with said strip advancing means, said driving disc having a plurality of concentric rings of pins located on one face thereof, a longitudinally slidable pinion for engaging one of said rings of pins, and means for digitally sliding said pinion from one ring to the next while the advancing means is at rest, said last-named means including a continuously driven input and a step-by-step positioned output.

3. A segmentized trace-generating unit for producing a space-time analogue curve telescoped into segments across the width of a relatively narrow strip comprising means for periodically advancing said strip longitudinally at a predetermined rate including a master source of continuous input power, a trace-generating head having a plurality of circularly located trace-generating elements thereon, said elments being spaced apart equally as measured circumferentially around the circle, said element spacing being equal to the effective width of the strip, variable speed driving means for rotating said generating head about the axis of said circle of elements including a driving disc directly driven with said strip advancing means, said driving disc having a plurality of concentric rings of pins located on one face thereof, a longitudinally slidable pinion for engaging one of said rings of pins, means for digitally sliding said pinion from one ring to the next while the advancing means is at rest, said last-named means including a continuously driven input directly connected to said master source of continuous power with means for oscillating a tipable plate, said plate being tipable in either of two directions alternatively, and means carried by said plate for engaging an output wheel on one side or the other thereof to produce a single step of rotation of said output wheel when said plate is tipped.

References Cited in the file of this patent

UNITED STATES PATENTS

| | | |
|---|---|---|
| 1,739,505 | Cunningham | Dec. 17, 1929 |
| 2,163,746 | Courtois-Suffit et al. | June 27, 1939 |
| 2,213,108 | Pollard | Aug. 27, 1940 |
| 2,628,539 | De Neergaard | Fb. 17, 1953 |
| 2,750,449 | Thompson et al. | June 12, 1956 |